(12) United States Patent
Yoon et al.

(10) Patent No.: US 9,738,329 B2
(45) Date of Patent: Aug. 22, 2017

(54) APPARATUS FOR IMPROVING AERODYNAMIC CHARACTERISTICS OF VEHICLE

(71) Applicant: Hyundai Motor Company, Seoul (KR)

(72) Inventors: Jin Young Yoon, Gyeonggi-do (KR); Hyun Gyung Kim, Gyeonggi-do (KR); Keon Soo Jin, Ulsan (KR); Ki Hong Lee, Seoul (KR); Dong Eun Cha, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/049,868

(22) Filed: Feb. 22, 2016

(65) Prior Publication Data

US 2017/0080986 A1    Mar. 23, 2017

(30) Foreign Application Priority Data

Sep. 21, 2015    (KR) .......................... 10-2015-0132905

(51) Int. Cl.
*B62D 35/00*    (2006.01)
*B60R 19/48*    (2006.01)

(52) U.S. Cl.
CPC ............ *B62D 35/005* (2013.01); *B60R 19/48* (2013.01); *B60R 2019/486* (2013.01)

(58) Field of Classification Search
CPC ....... B60R 19/48; B60R 19/52; B62D 35/005; B62D 35/02

USPC ............................ 296/180.1, 193.1; 293/115
See application file for complete search history.

(56) References Cited

U.S. PATENT DOCUMENTS

| | | | | |
|---|---|---|---|---|
| 4,457,558 A | * | 7/1984 | Ishikawa .............. | B62D 35/005 123/41.05 |
| 7,784,576 B2 | * | 8/2010 | Guilfoyle .............. | B60K 11/04 123/41.04 |
| 2013/0180789 A1 | * | 7/2013 | Maurer ................... | B60R 19/52 180/68.1 |

FOREIGN PATENT DOCUMENTS

| | | | |
|---|---|---|---|
| DE | 102011056663 A1 * | 6/2013 | .......... B62D 35/005 |
| JP | H0567334 B2 | 9/1993 | |
| JP | H07-137669 A | 5/1995 | |
| JP | 2011-088584 A | 5/2011 | |
| JP | 2015-044538 A | 3/2015 | |
| KR | 1997-0035459 A | 7/1997 | |
| KR | 2004-0014780 A | 2/2004 | |
| KR | 10-2013-0074579 A | 7/2013 | |
| KR | 2014-0032620 A | 3/2014 | |
| WO | 2007/108803 A1 | 9/2007 | |

* cited by examiner

*Primary Examiner* — Jason S Daniels
(74) *Attorney, Agent, or Firm* — Mintz Levin Cohn Ferris Glovsky and Popeo, P.C.; Peter F. Corless

(57) ABSTRACT

An apparatus for improving aerodynamic characteristics of a vehicle is provided. In particular, the apparatus includes grill shutter and a bumper lip that are operated simultaneously using one actuator and power transfer mechanism based on a vehicle speed.

8 Claims, 5 Drawing Sheets

APPARATUS FOR IMPROVING AERODYNAMIC CHARACTERISTICS OF VEHICLE

CROSS REFERENCE TO RELATED APPLICATION

The present application claims priority of Korean Patent Application No. 10-2015-0132905 filed on Sep. 21, 2015, the entire contents of which is incorporated herein for all purposes by this reference.

BACKGROUND

Field of the Invention

The present invention relates to an apparatus for improving aerodynamic characteristics of a vehicle, and, more particularly, to an apparatus for improving aerodynamic characteristics of a vehicle, in which an active air flap and an active air skirt are simultaneously operated based on a vehicle speed.

Description of the Related Art

Air resistance is applied to a vehicle due to a collision between a vehicle body and air in the atmosphere when the vehicle travels. In particular, the air resistance is mainly classified into drag and lift. The drag refers to a resistance force applied to the vehicle body, which directly collides with air when the vehicle travels, in a direction opposite to the traveling thereof. The lift refers to a phenomenon in which the vehicle body is lifted by a difference in pressure between the upper and lower portion of the vehicle body generated when the vehicle travels.

Accordingly, the vehicle requires elements for improving aerodynamic characteristics and fuel efficiency by reducing drag and lift. Devices for improving aerodynamic characteristics include, for example, an active air flap and an active air skirt actively operated based on a vehicle speed.

The active air flap is a device that opens and closes an aperture in a radiator grill formed at a front bumper based on a vehicle speed. When the vehicle travels at low speed, the active air flap forms a large opening angle of the radiator grill and thus, a significant amount of air is introduced into an engine room, thereby ensuring safety of heat exchanger components in the engine room. When the vehicle travels at high speed, the active air flap forms a minimal opening angle of the radiator grill and thus, a smaller amount of air is introduced into the engine room, thereby improving aerodynamic characteristics and fuel efficiency.

When the vehicle travels at high speed, the active air skirt (e.g. a front spoiler, a nose spoiler, and an air dam) reduces an amount of air introduced into an underbody through the front bumper, thereby decreasing lift and thus improving aerodynamic characteristics. However, the active air flap and the active air skirt each have a separate driving source and are individually operated, even though the mounting positions thereof are adjacent to each other in the front portion of the vehicle. Accordingly, there are problems in that the number of parts of the vehicle is increased, the vehicle cost increases, the weight of the vehicle increases, and fuel efficiency decreases.

The foregoing is intended merely to aid in the understanding of the background of the present invention, and is not intended to mean that the present invention falls within the purview of the related art that is already known to those skilled in the art.

SUMMARY

Accordingly, the present invention provides an apparatus for improving aerodynamic characteristics of a vehicle, in which a grill shutter operating as an air flap and a bumper lip operating as an air skirt are simultaneously operated based on a vehicle speed, thereby reducing the number of parts and costs of a vehicle and improving fuel efficiency due to a reduction in weight of the vehicle.

In accordance with one aspect of the present invention, an apparatus for improving aerodynamic characteristics of a vehicle may include a grill shutter disposed behind a radiator grill to rotate for opening and closing the radiator grill, a bumper lip that rotates to protrude toward a lower portion of a front bumper or to be pressed against an under-cover, an actuator operated by a controller, and a power transfer mechanism that simultaneously connects the actuator, the grill shutter, and the bumper lip to transfer power thereto and the grill shutter and the bumper lip may be operated simultaneously by power of the actuator.

The controller may be configured to operate the actuator by a signal of a vehicle speed sensor transmitted thereto. The actuator and the power transfer mechanism may be covered by (e.g., enclosed by) a housing, and the housing may be disposed inside a bumper cover for covering the lower portion of the front bumper while being connected to a vehicle body. The actuator may be a direct-current (DC) motor.

The power transfer mechanism may include a worm gear connected to the actuator, a worm wheel gear engaged with the worm gear, a reduction gear engaged with the worm wheel gear, a reduction gear wheel concentrically connected to the reduction gear to rotate together therewith, a grill shutter wheel and an intermediate gear wheel installed to face each other with the reduction gear wheel being interposed therebetween, a chain belt that connects the reduction gear wheel, the grill shutter wheel, and the intermediate gear wheel, an intermediate gear concentrically connected to the intermediate gear wheel to rotate together therewith, and a reverse gear engaged with the intermediate gear to rotate in an opposite direction. Further, one end of the grill shutter may be coupled to the grill shutter wheel to rotate the grill shutter along with the grill shutter wheel, and one end of the bumper lip may be coupled to the reverse gear to rotate the bumper lip along with the reverse gear.

The power transfer mechanism may include a worm gear connected to the actuator, a worm wheel gear engaged with the worm gear, a reduction gear engaged with the worm wheel gear, first and second reduction gear wheels concentrically connected to the reduction gear to rotate together therewith, a grill shutter wheel and an intermediate gear wheel installed to face each other with the first and second reduction gear wheels being interposed therebetween, a first chain belt that connects the first reduction gear wheel and the grill shutter wheel, a second chain belt that connects the second reduction gear wheel and the intermediate gear wheel, an intermediate gear concentrically connected to the intermediate gear wheel to rotate together therewith, and a reverse gear engaged with the intermediate gear to rotate in an opposite direction. Further, one end of the grill shutter may be coupled to the grill shutter wheel to rotate the grill shutter along with the grill shutter wheel, and one end of the bumper lip may be coupled to the reverse gear to rotate the bumper lip along with the reverse gear.

As apparent from the above description, a grill shutter and a bumper lip for improving aerodynamic characteristics of a vehicle may be operated simultaneously through one actuator and power transfer mechanism based on a vehicle speed. Consequently, it may be possible to reduce the number of parts, weight, and costs, and to improve fuel efficiency, compared to structure in which an air flap and an air skirt are each individually operated using a separate driving source.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
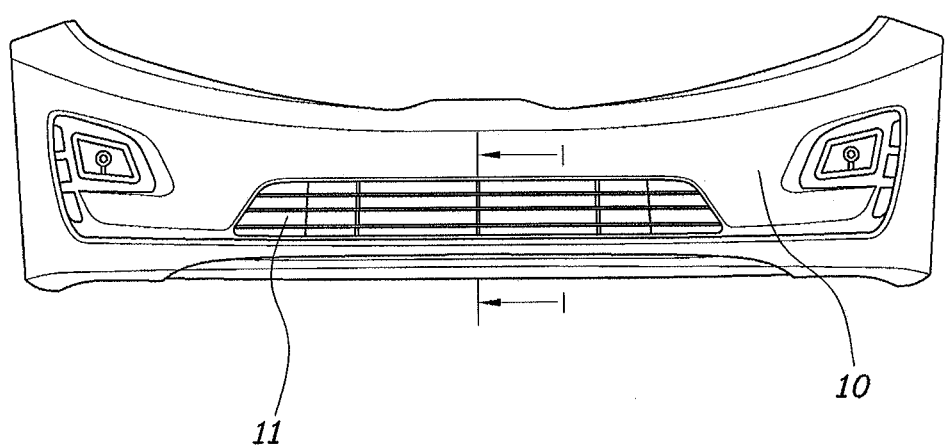
FIG. 1 is a front view illustrating a front bumper equipped with an apparatus for improving aerodynamic characteristics according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

An apparatus for improving aerodynamic characteristics of a vehicle according to the exemplary embodiments of the present invention will be described below with reference to the accompanying drawings.

As illustrated in FIGS. 1 to 5, the apparatus for improving aerodynamic characteristics of a vehicle according to the exemplary embodiment of the present may include a grill shutter 20 disposed behind a radiator grill 11 formed at a front bumper 10 to rotate for opening and closing the radiator grill 11, a bumper lip 40 configured to rotate to protrude toward the lower portion of the front bumper 10 or to be pressed against an under-cover 30, an actuator 60 operated by a controller 50, and a power transfer mechanism 70 which simultaneously connects the actuator 60, the grill shutter 20, and the bumper lip 40 to transfer power thereto to simultaneously operate the grill shutter 20 and the bumper lip 40 by the power of the actuator 60.

The controller 50 may be configured to operate the actuator 60 by signals of a vehicle speed sensor 80 transmitted thereto. Through such a configuration, the grill shutter 20 and the bumper lip 40 may be actively operated based on a vehicle speed detected by the vehicle speed sensor 80. The actuator 60 and the power transfer mechanism 70 may be covered or enclosed by a housing 90. The housing 90 may be disposed inside a bumper cover 100 to cover or enclose the lower portion of the front bumper 10 while being connected to a vehicle body 110. In other words, the housing 90 that covers the actuator 60 and the power transfer mechanism 70 may be disposed in the inner space of the bumper cover 100 to not be exposed to the exterior. The aesthetic external appearance of the apparatus may be achieved, and the durability thereof may be improved by protecting the apparatus from foreign substances on the road by the housing 90. The actuator 60 may use a DC motor which is bilaterally rotatable and is cost effective, but the present invention is not limited thereto.

Figure 2:
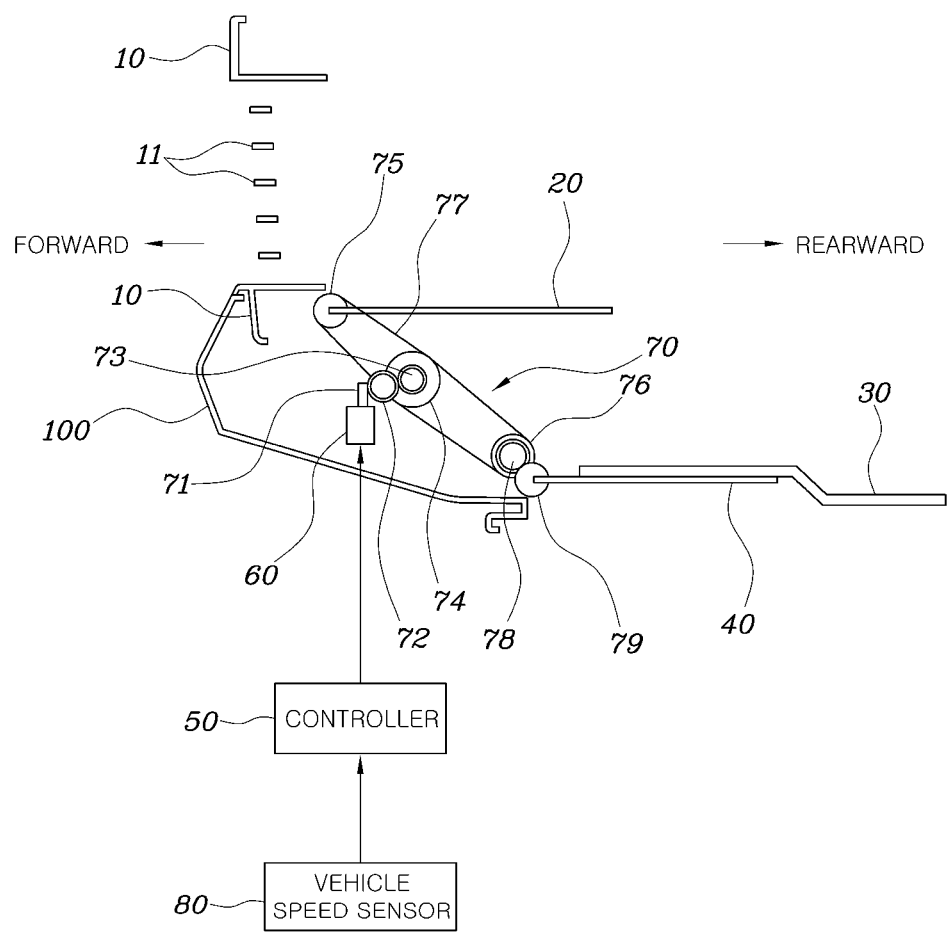
FIG. 2 is a cross-sectional view taken along line "I-I" of FIG. 1 and illustrates the state before the apparatus for improving aerodynamic characteristics is operated according to an exemplary embodiment of the present invention.
Figure 3:
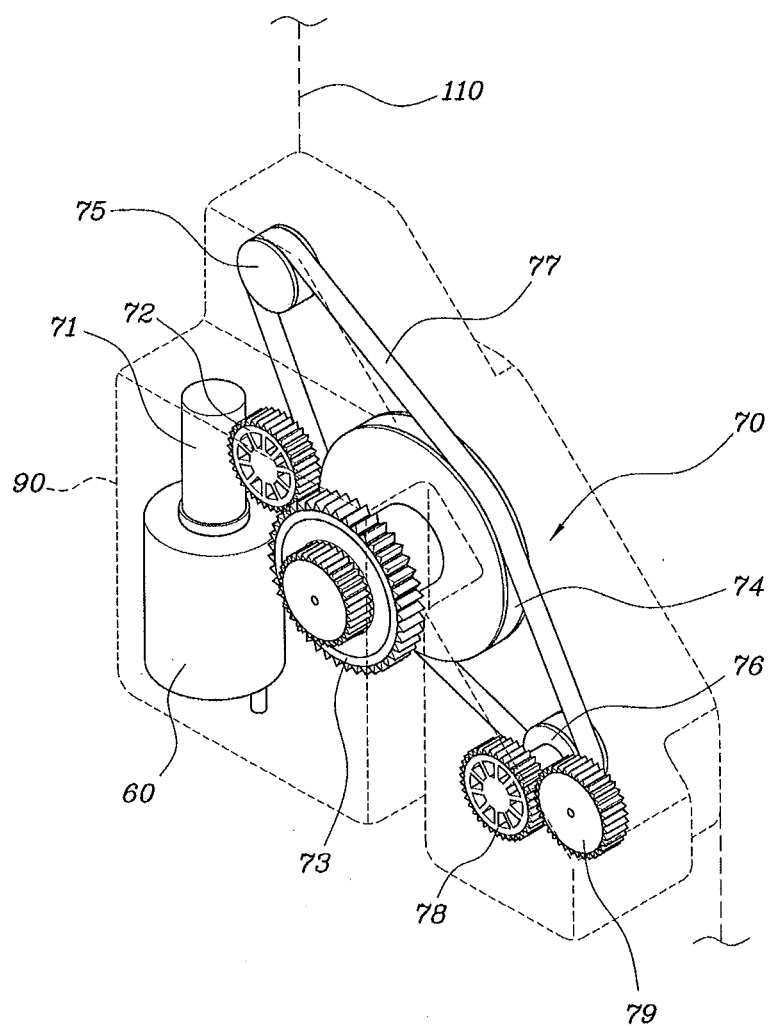
FIG. 3 is a view illustrating a first example of an actuator and a power transfer mechanism according to the exemplary embodiment of the present invention.

Meanwhile, as illustrated in FIGS. 2 and 3, a power transfer mechanism 70 according to a first example of the present invention may include a worm gear 71 connected to an actuator 60 to be rotated by the power of the actuator 60, a worm wheel gear 72 engaged with the worm gear 71, a reduction gear 73 engaged with the worm wheel gear 72, a reduction gear wheel 74 concentrically connected to the reduction gear 73 to rotate together therewith, a grill shutter wheel 75 and an intermediate gear wheel 76 installed to face each other with the reduction gear wheel 74 interposed therebetween, a chain belt 77 that connects the reduction gear wheel 74, the grill shutter wheel 75, and the intermediate gear wheel 76, an intermediate gear 78 concentrically connected to the intermediate gear wheel 76 to rotate together therewith, and a reverse gear 79 engaged with the intermediate gear 78 to rotate in an opposite direction. In particular, one end (e.g., a first end) of the grill shutter 20 may be coupled to the rotational center shaft of the grill shutter wheel 75, and the grill shutter 20 may be configured to rotate along with the grill shutter wheel 75. One end (e.g., a first end) of the bumper lip 40 may be coupled to the rotational center shaft of the reverse gear 79, and the bumper lip 40 may be configured to rotate along with the reverse gear 79.

Figure 5:
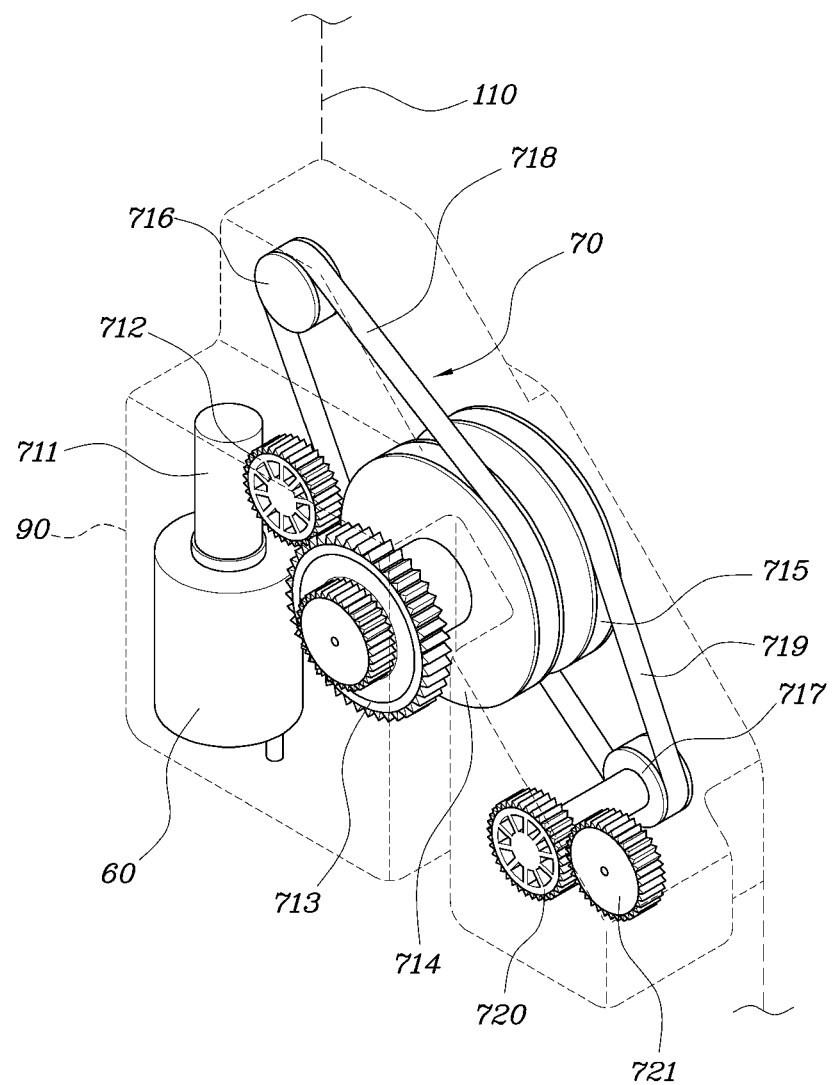
FIG. 5 is a view illustrating a second example of an actuator and a power transfer mechanism according to the exemplary embodiment of the present invention.

As illustrated in FIG. 5, a power transfer mechanism 70 according to a second example of the present invention may include a worm gear 711 connected to an actuator 60 to be rotated by the power of the actuator 60, a worm wheel gear 712 engaged with the worm gear 711, a reduction gear 713 engaged with the worm wheel gear 712, first and second reduction gear wheels 714 and 715 concentrically connected to the reduction gear 713 to rotate together therewith, a grill shutter wheel 716 and an intermediate gear wheel 717 installed to face each other with the first and second reduction gear wheels 714 and 715 interposed therebetween, a first chain belt 718 that connects the first reduction gear wheel 714 and the grill shutter wheel 716, a second chain belt 719 that connects the second reduction gear wheel 715 and the intermediate gear wheel 717, an intermediate gear 720 concentrically connected to the intermediate gear wheel 717 to rotate together therewith, and a reverse gear 721 engaged with the intermediate gear 720 to rotate in an opposite direction.

The power transfer mechanism according to the first example may have a structure that connects one reduction gear wheel 74, the grill shutter wheel 75, and the intermediate gear wheel 76 using one chain belt 77. The power transfer mechanism according to the second example may have a structure that connects the first reduction gear wheel 714 and the grill shutter wheel 716 using the first chain belt 718, and connects the second reduction gear wheel 715 and the intermediate gear wheel 717 using the second chain belt 719. Since the power transfer mechanism according to the first example has fewer number of parts compared to the power transfer mechanism according to the second example, it may be possible to reduce weight and costs thereof. Since the power transfer mechanism according to the second example allows the tension of the chain belt to be maintained in an optimal state compared to the power transfer mechanism according to the first example, it may be possible to more efficiently transfer power.

Hereinafter, the operation of the apparatus having one chain belt 77 according to the present invention will be described with reference to FIGS. 2 and 4.

FIG. 2 illustrates the state in which the vehicle is stopped or travels at low speed. In particular, the free end of the grill shutter 20, which is not coupled to the grill shutter wheel 75, may be rotated rearward, and thus the radiator grill 11 may be maintained in an opened state. In addition, the free end of the bumper lip 40, which is not coupled to the reverse gear 79, may be rotated upward, and thus the bumper lip 40 may be maintained in the state in which it is pressed against the under-cover 30.

When the vehicle speed is changed to a high speed (e.g., when the vehicle speed increases or the vehicle is started) in the state of FIG. 2, the actuator 60 may be operated by the controller 50, the worm gear 71 may be rotated by the operation of the actuator 60, the worm wheel gear 72 may be rotated in a clockwise direction from the state illustrated in FIG. 2 by the rotation of the worm gear 71, and the reduction gear 73 and reduction gear wheel 74, and the grill shutter wheel 75, intermediate gear wheel 76, and intermediate gear 78 may be rotated in a counterclockwise direction. Thus, the free end of the grill shutter 20, which is not coupled to the grill shutter wheel 75, may be rotated upward, as illustrated in FIG. 4, by the rotation of the chain belt 77, thereby allowing the radiator grill 11 to be sealed. Accordingly, the aerodynamic characteristics of the vehicle may be improved.

Figure 4:
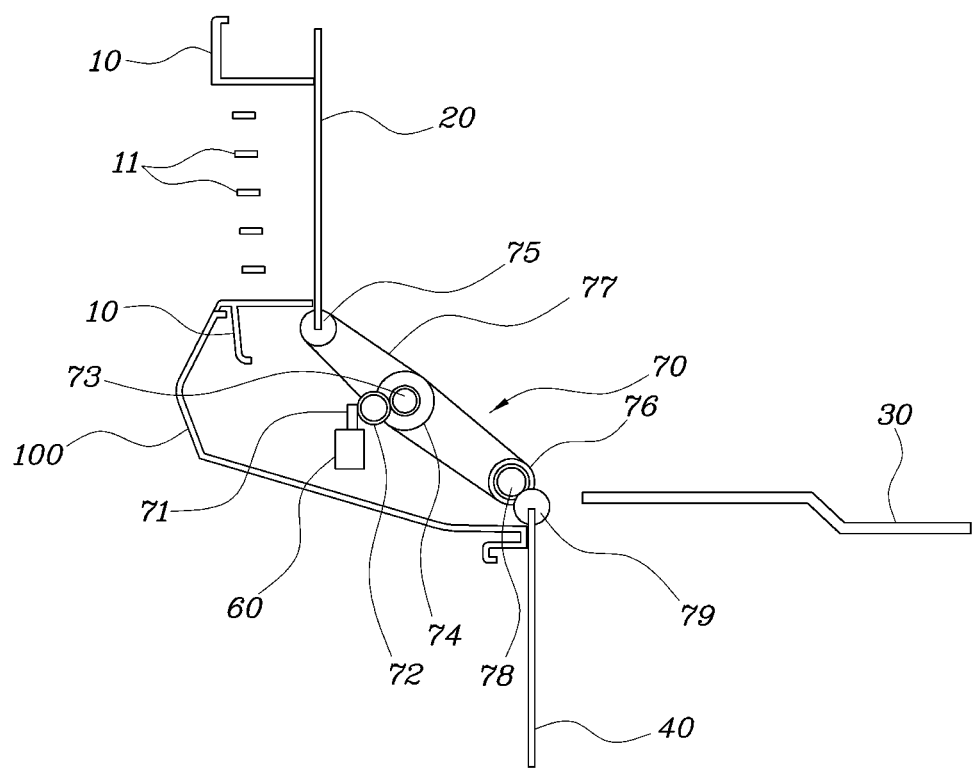
FIG. 4 is a view illustrating the state after the apparatus for improving aerodynamic characteristics is operated in FIG. 2 according to an exemplary embodiment of the present invention.

In addition, since the reverse gear 79 may be rotated in the clockwise direction by the counterclockwise rotation of the intermediate gear 78, the free end of the bumper lip 40, which is not coupled to the reverse gear 79, may be rotated downward as illustrated in FIG. 4, thereby allowing the lower portion of the bumper lip 40 to protrude toward the lower portion of the front bumper 10. Through such a structure, since the amount of air introduced into the undercover 30 may be reduced, lift generated in the vehicle may be reduced and the aerodynamic characteristics of the vehicle may be further improved. When the vehicle speed is changed to a low speed (e.g., when the vehicle speed is decreased or the vehicle is stopped) after the operation in FIG. 4, the power transfer mechanism 70 may be rotated by the actuator 60 by the controller 50 in a direction opposite to the above-mentioned direction. Thus, the grill shutter 20 and the bumper lip 40 may be returned to the initial state of FIG. 2.

In accordance with the exemplary embodiment of the present invention, the grill shutter 20 and the bumper lip 40 for improving the aerodynamic characteristics of the vehicle may be operated simultaneously using one actuator 60 and power transfer mechanism 70 based on a vehicle speed. Consequently, it may be possible to reduce the number of parts, weight, and costs, and to improve fuel efficiency, compared to structure in which an air flap and an air skirt are each individually operated using a separate driving source.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An apparatus for improving aerodynamic characteristics of a vehicle, comprising:
  a grill shutter disposed behind a radiator grill to rotate for opening and closing the radiator grill;
  a bumper lip configured to rotate to protrude toward a lower portion of a front bumper or to be pressed against an under-cover;
  an actuator operated by a controller to rotate the grill shutter and the bumper lip; and
  a power transfer mechanism that simultaneously connects the actuator, the grill shutter, and the bumper lip to transfer power thereto to simultaneously operate the grill shutter and the bumper lip by power of the actuator,
  wherein the power transfer mechanism includes:
  a worm gear connected to the actuator;
  a worm wheel gear engaged with the worm gear;
  a reduction gear engaged with the worm wheel gear;
  a reduction gear wheel concentrically connected to the reduction gear to rotate together therewith;
  a grill shutter wheel and an intermediate gear wheel installed to face each other with the reduction gear wheel interposed therebetween;
  a chain belt connecting the reduction gear wheel, the grill shutter wheel, and the intermediate gear wheel;
  an intermediate gear concentrically connected to the intermediate gear wheel to rotate together therewith; and
  a reverse gear engaged with the intermediate gear to rotate in an opposite direction, wherein one end of the grill shutter is coupled to the grill shutter wheel to rotate the grill shutter along with the grill shutter wheel, and wherein one end of the bumper lip is coupled to the reverse gear to rotate the bumper lip along with the reverse gear.

2. The apparatus according to claim 1, wherein the controller is configured to operate the actuator by a signal of a vehicle speed sensor transmitted thereto.

3. The apparatus according to claim 1, wherein the actuator and the power transfer mechanism are covered by a housing disposed inside a bumper cover to cover the lower portion of the front bumper while being connected to a vehicle body.

4. The apparatus according to claim 1, wherein the actuator is a direct-current (DC) motor.

5. An apparatus for improving aerodynamic characteristics of a vehicle, comprising:
 a grill shutter disposed behind a radiator grill to rotate for opening and closing the radiator grill;
 a bumper lip configured to rotate to protrude toward a lower portion of a front bumper or to be pressed against an under-cover;
 an actuator operated by a controller to rotate the grill shutter and the bumper lip; and
a power transfer mechanism that simultaneously connects the actuator, the grill shutter, and the bumper lip to transfer power thereto simultaneously operate the grill shutter and the bumper lip by power of the actuator,
 wherein the power transfer mechanism includes:
 a worm gear connected to the actuator;
 a worm wheel gear engaged with the worm gear;
 a reduction gear engaged with the worm wheel gear;
 first and second reduction gear wheels concentrically connected to the reduction gear to rotate together therewith;
 a grill shutter wheel and an intermediate gear wheel installed to face each other with the first and second reduction gear wheels interposed therebetween;
 a first chain belt that connects the first reduction gear wheel and the grill shutter wheel;
 a second chain belt that connects the second reduction gear wheel and the intermediate gear wheel;
 an intermediate gear concentrically connected to the intermediate gear wheel to rotate together therewith; and
 a reverse gear engaged with the intermediate gear to rotate in an opposite direction,
 wherein one end of the grill shutter is coupled to the grill shutter wheel to rotate the grill shutter along with the grill shutter wheel, and
 wherein one end of the bumper lip is coupled to the reverse gear to rotate the bumper lip along with the reverse gear.

6. The apparatus according to claim 5, wherein the controller is configured to operate the actuator by a signal of a vehicle speed sensor transmitted thereto.

7. The apparatus according to claim 5, wherein the actuator and the power transfer mechanism are covered by a housing disposed inside a bumper cover to cover the lower portion of the front bumper while being connected to a vehicle body.

8. The apparatus according to claim 5, wherein the actuator is a direct-current (DC) motor.

* * * * *